Patented Mar. 10, 1931

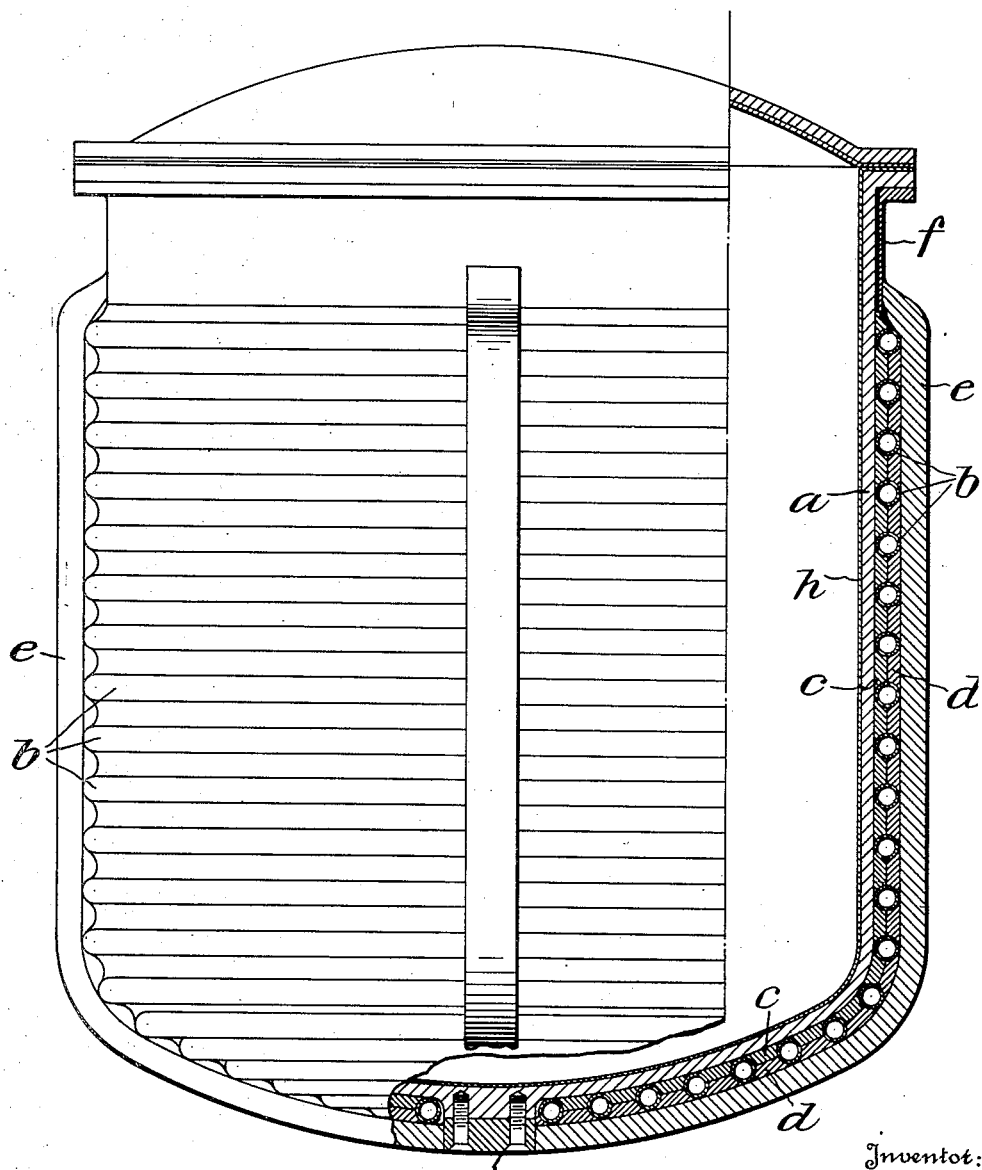

1,796,123

UNITED STATES PATENT OFFICE

RICHARD SAMESREUTHER, OF BUTZBACH HESSEN, AND GEORG KRÄNZLEIN, OF HOCHST-ON-THE-MAIN, GERMANY, ASSIGNORS OF ONE-HALF TO I. G. FARBENINDUSTRIE AKTIENGESELLSCHAFT, OF FRANKFORT-ON-THE-MAIN, GERMANY, AND ONE-HALF TO SAMESREUTHER & CO., G. M. B. H., OF BUTZBACH HESSEN, GERMANY

HEAT-EXCHANGE WALL FOR CONTAINERS

Application filed June 8, 1928, Serial No. 283,993, and in Germany June 16, 1927.

Our present invention relates to plates or walls of vessels which are to be heated or cooled.

In our co-pending U. S. A. patent application, Ser. No. 200,257, filed June 20, 1927, we have described a process of manufacturing heating and cooling elements by welding tubes to the plane or curved surface of a metal with or without the aid of a soft metal support (skelp) of good heat conductivity, in which process an additional welding metal is used in case the plane or curved surface of the metal does not possess the qualities of ingot iron.

Now we have found that plane or curved metal sheets which do not possess the qualities of ingot iron may also be formed into heating or cooling elements by pressing a support of soft metal (skelp) as for instance copper, lead or aluminium between the tubes and the surface of the metal plate or wall and then welding the exposed parts of the tubes by one of the usual methods so as to unite them closely. Before carrying out the welding operation, the coils of the tubes may be pressed upon the support of soft metal by means of solid metal clamps which on their part are firmly united with the plane or curved surface of the metal by a cam device, flanges or other auxiliary means. Advantageously the clamps are in this case united with the tubes by welding. In this manner it is possible to prepare from iron silicide, cast iron, aluminium, silver, nickel steels, novel kinds of apparatus, as for instance pans or boilers, which can indirectly be heated or cooled. Owing to the intimate union effected between the coils and the walls of the vessel by means of the interposed support of soft metal, an excellent caloric effect is ensured. In particular enamelled boilers provided with heating or cooling tubes which are made in the above described manner, are of great technical value, because they can not only be cooled but, unlike the enamelled boilers hitherto used, be heated to temperatures up to 300° C. Enamelled boilers thus made comply with the requirements of the legal regulations concerning steam containers, since they are sufficiently strengthened by the tubes welded onto them. In employing such boilers all the dangers are avoided which are encountered with cast-iron enamelled vessels, the use of which as steam containers could hitherto often not be dispensed with.

The accompanying drawing illustrates the invention. Referring to the drawing which is a front elevation with parts broken away to show a section of a receptacle the walls of which are constructed in accordance with the invention, $a$ is the metal wall of the vessel the inner surface of which carries an enamel coating $h$, $b$ are the tubes, $c$ is soft heat conducting metal lying between the tubes $b$ and in which the tubes are partially embedded, $d$ is the welding metal which unites the exposed surfaces of the tubes, i. e., the surfaces which are not embedded in the soft metal $c$ and $e$, $e$ are clamps for holding the tubes in place before the welding metal is applied. The clamps $e$ are held in place by welding to the angle ring $f$ at their uper ends and by the cam device $g$ at their lower ends. The soft metal $c$ is firmly pressed into the space between the tubes $b$ before the welding so that no air spaces are left. As stated the tubes are united to each other by the welding metal and at the points of contact the clamps $e$ are welded to the tubes $b$.

We claim:

1. A plate or wall of a vessel comprising a metal sheet, a soft heat conducting metal in contact with said metal sheet, spaced tube sections adapted for the passage of fluid partially embedded in said soft metal, and a welding metal uniting the exposed portions of said tube sections.

2. A plate or wall of a vessel as defined in claim 1 in which the soft heat conducting metal is copper.

3. A plate or wall of a vessel comprising a metal sheet, a soft heat conducting metal in contact with said metal sheet, spaced tube sections adapted for the passage of fluid partially embedded in said soft metal, a clamping member extending transversely of said tube sections and in contact with the exposed portions thereof and a welding metal uniting the exposed surfaces of said tube sections to each other and to said clamping member.

4. A plate or wall of a vessel as defined in claim 3 in which the soft heat conducting metal is copper.

5. A plate or wall of a vessel as defined in claim 1 in which the metal sheet is provided on one face with a coating of enamel.

In testimony whereof, we affix our signatures.

RICHARD SAMESREUTHER.
GEORG KRÄNZLEIN.